United States Patent
Cooper et al.

(10) Patent No.: US 10,194,022 B2
(45) Date of Patent: Jan. 29, 2019

(54) SYSTEM AND METHOD FOR AUTOMATICALLY DETECTING UNDESIRED CALLS

(71) Applicant: DIALOGTECH INC., Chicago, IL (US)

(72) Inventors: Thomas Cooper, North Ridgeville, OH (US); Kenneth J. Mitchner, Chicago, IL (US)

(73) Assignee: DIALOGTECH INC., Chicago, IL (US)

( * ) Notice: Subject to any disclaimer, the term of this patent is extended or adjusted under 35 U.S.C. 154(b) by 0 days.

(21) Appl. No.: 15/639,392

(22) Filed: Jun. 30, 2017

(65) Prior Publication Data

US 2018/0013881 A1 Jan. 11, 2018

Related U.S. Application Data

(60) Provisional application No. 62/358,343, filed on Jul. 5, 2016.

(51) Int. Cl.
| | |
|---|---|
| *H04M 3/42* | (2006.01) |
| *H04M 3/22* | (2006.01) |
| *H04M 3/436* | (2006.01) |
| *H04M 3/493* | (2006.01) |
| *H04M 3/58* | (2006.01) |

(52) U.S. Cl.
CPC ......... *H04M 3/2281* (2013.01); *H04M 3/436* (2013.01); *H04M 3/4365* (2013.01); *H04M 3/493* (2013.01); *H04M 3/58* (2013.01); *H04M 2203/2027* (2013.01); *H04M 2203/6027* (2013.01); *H04M 2203/6072* (2013.01); *H04M 2242/18* (2013.01); *H04Q 2213/13139* (2013.01)

(58) Field of Classification Search
CPC ............................ H04M 3/2281; H04M 3/436
USPC ............................ 379/210.02, 210.03–215.01
See application file for complete search history.

(56) References Cited

U.S. PATENT DOCUMENTS

| | | | |
|---|---|---|---|
| 2012/0215862 A1* | 8/2012 | Cai ...................... | G06Q 10/107 709/206 |
| 2014/0119527 A1 | 5/2014 | Cohen | |
| 2015/0101026 A1* | 4/2015 | Kraus ..................... | H04W 4/21 726/4 |
| 2015/0195403 A1* | 7/2015 | Goulet .................. | H04M 3/436 379/142.05 |

FOREIGN PATENT DOCUMENTS

WO      2014096832 A1    6/2014

OTHER PUBLICATIONS

Partial EP Search Report for Application No. 17179444.9-1853, dated Nov. 10, 2017.

* cited by examiner

*Primary Examiner* — William Deane, Jr.

(74) *Attorney, Agent, or Firm* — Barnes & Thornburg LLP

(57) ABSTRACT

A system is provided for thwarting the undesired incoming calls and eliminating the impact of robocalls, tollfree pumping, political spam, data collection bots, and other phone fraud forms. The system has a spam detection unit with a plurality of spam type modules and each spam type module is configured to detect a different type of spam.

18 Claims, 3 Drawing Sheets

SYSTEM AND METHOD FOR AUTOMATICALLY DETECTING UNDESIRED CALLS

This patent application claims priority to and benefit of U.S. Provisional Patent Application No. 62/358,343 filed on Jul. 5, 2016, the disclosure of which is now expressly incorporated herein by reference.

The present application relates to telecommunications as well as Interactive Voice Recognition (IVR) systems.

BACKGROUND

Phone fraud is a billion dollar a year business and includes phone subscriber attempting to defraud the telephony carriers, telephony carriers attempting to defraud a subscriber, or a third party attempting to defraud either or both of them.

Often these fraudulent schemes involve the use of autodialers, which are electronic devices or software that automatically dial telephone numbers. Conventionally, once the call has been answered, the autodialer either plays a recorded message or connects the call to a live person. Thus, it is conventionally known for autodialers to play a pre-recorded message, which is often called "voice broadcasting", or "robocalling." It is also conventionally known for some voice broadcasting messages to ask the person system who answers to press a button on their phone keypad. One example of this type of technique used to reach out to people is opinion polls in which recipients are asked to press one digit if they support one side of an issue, or another digit if they support the other side. This type of call is often called "outbound interactive voice response."

One lucrative and illegal fraudulent activity involves the use of autodialers and outbound interactive voice response techniques to steal from 1-800 number owners. In the United States, telephone carriers are paid a fee for connecting a call spanning their carrier network to a subscriber served by their network, with the charges billed to the called number or subscriber if the called number is a 1-800 or toll free number. Thus, in the case of calls being made to a 1-800 number, a fraudulent party working in connection with a telephone carrier potentially could auto-dial 1-800 numbers to generate fees paid to the telephone carrier.

This may be done using auto dialers, which are electronic devices or software that automatically dial telephone numbers and, once the call has been answered, the autodialer plays a recorded message to maintain the call so as to generate "minutes" and associated fees billed to the 1-800 number owner and paid to the telephone carrier.

SUMMARY

Accordingly, various disclosed embodiments provide a system, methods, and computer program products for thwarting the undesired incoming calls and eliminating the impact of robocalls, tollfree pumping, political spam, data collection bots, and other phone fraud forms.

In some embodiments, an automated method is provided for determining and terminating undesired inbound calls including receiving an incoming phone call and activating a controller in response. The controller may hold the incoming call and record channel separated audio from the incoming call. A spam detection engine may evaluate the recorded channel separated audio to determine if the incoming call is spam. In response to a determination the call is spam; an IVR system may prompt the incoming call to input a code with an IVR system. When the code input by the incoming call does not match the prompted code, the call is terminated. The incoming call bypasses the internal voice recognition system when the spam detection engine determines that the incoming call is not spam. When the code input by the incoming call matches the prompted code, an outbound call to a call destination is initiated.

Evaluating the recorded channel separated audio may include segmenting the recorded audio into segments, building partition groups from the processed segments, comparing the partition groups to stored spam profiles, and deriving an accuracy number based on the number of segment partitions that match a profile versus the number of segment partitions that do not match the profile. When the accuracy number exceeds a threshold, the incoming call is identified as spam In some embodiments, a telecommunications system may be provided for determining and blocking undesired inbound calls. The system may comprise a controller that receives and holds an incoming call and records audio from the incoming call; a spam detection unit that evaluates the audio from the incoming call and determines whether the incoming call is spam; and a processor that provides a code prompt to the incoming call and a prompt to the incoming call to input the code in response to a determination by the spam detection unit that the incoming call is spam and bypasses the code prompt in response to a determination by the spam detection unit that the incoming call is not spam. The processor terminates the incoming call when the code input by the incoming call does not match the provided code prompt.

The spam detection unit may include a plurality of spam type modules and each spam type module is configured to detect a different type of spam. The plurality of spam type modules may evaluate the audio in parallel. Each spam type module may compare the audio with known spam patterns and the audio is determined to be a type of spam if a particular confidence threshold is met between the audio and a known spam pattern. The controller may be configured to pass the audio through dead-air application to identify a digitally silent call. The system may identify spam in about six seconds.

Each of the plurality of spam type modules may be configured to segment the recorded audio into segments, build partition groups from the processed segments, compare the partition groups to stored spam profiles, and derive an accuracy number based on the number of segment partitions that match a profile versus the number of segment partitions that do not match the profile. The controller may update the spam detection engine with the recorded audio from the blocked call. The recorded audio is fed into a baseline spam pattern of a type of spam the audio was identified as.

In accordance with at least one embodiment, the system, methods and computer program products may include a control that receives and holds and incoming call and records audio from the incoming call; and a spam detection unit configured to determine whether the incoming call is spam. The spam detection unit may include a plurality of spam type modules, each module configured to identify a particular type of spam. The spam detection unit may segment the recorded audio into different segment lengths for analysis in each spam type module. The spam detection unit may include spam type modules for one or more of tollfree pumping, political spam, and data collection bots. A processor may be configured to terminate the incoming call when the spam detection unit determines the incoming call is spam.

These and other features of the present disclosure will become more apparent from the following description of the illustrative embodiments.

DETAILED DESCRIPTION

In order to thwart such fraudulent activities, the inventors had previously utilized conventionally available technology with their Interactive Voice Response (IVR) systems that requires a caller calling a 1-800 number to press a button on their phone keypad; this enables the IVR system to confirm that there is a live person, rather than an auto dialer, on the voice call.

However, fraudsters using these autodialers subsequently determined that this confirmation scheme can potentially be circumvented by programming the autodialer to emit one or more DTMF codes that would be emitted by a caller pressing one or more buttons on their keypad. In this way, the fraudsters attempt to approximate or impersonate a live caller to the IVR system, thereby maximizing the period of time the call continues and increasing the fees charged to the 1-800 number owner.

To address the above-described new technology-specific attack performed by fraudsters, disclosed embodiments provide a technical-based solution wherein all incoming calls are held so as not to be routed to a recipient corresponding to the intended recipient for the incoming call for a predetermined period of time while audio from the incoming call is analyzed to determine if the audio matches predefined fraudulent audio patterns determined to be indicative of robocalls, tollfree pumping, political spam, data collection bots, and other phone fraud forms.

In response to a determination that the call audio is similar or matches one of a number of predetermined fraudulent audio patterns, the call is then sent to an (IVR) where the caller is prompted to enter a code. If the caller fails to enter the code correctly, the call is identified as fraudulent and terminated. If the caller enters the code successfully, the call is routed to its destination. In response to a determination that the call does not match a predefined fraudulent audio pattern, the call is routed to its destination.

Using this methodology, the disclosed embodiments are configured to circumvent fraudulent, nefarious or unwanted use of autodialers, smart autodialer (autodialer capable of personalizing messages and collecting touch tone or speech feedbacks), semi-automatic dialers (human controlled productivity tools for telemarketing agents), telemarketing dialers (capable of making large number of simultaneous phone calls and including an application programming interface (API) for system integration), and natural predictive dialers (wherein call progress analysis is performed by the autodialer in parallel with connection to a telemarketing agent).

Figure 1:
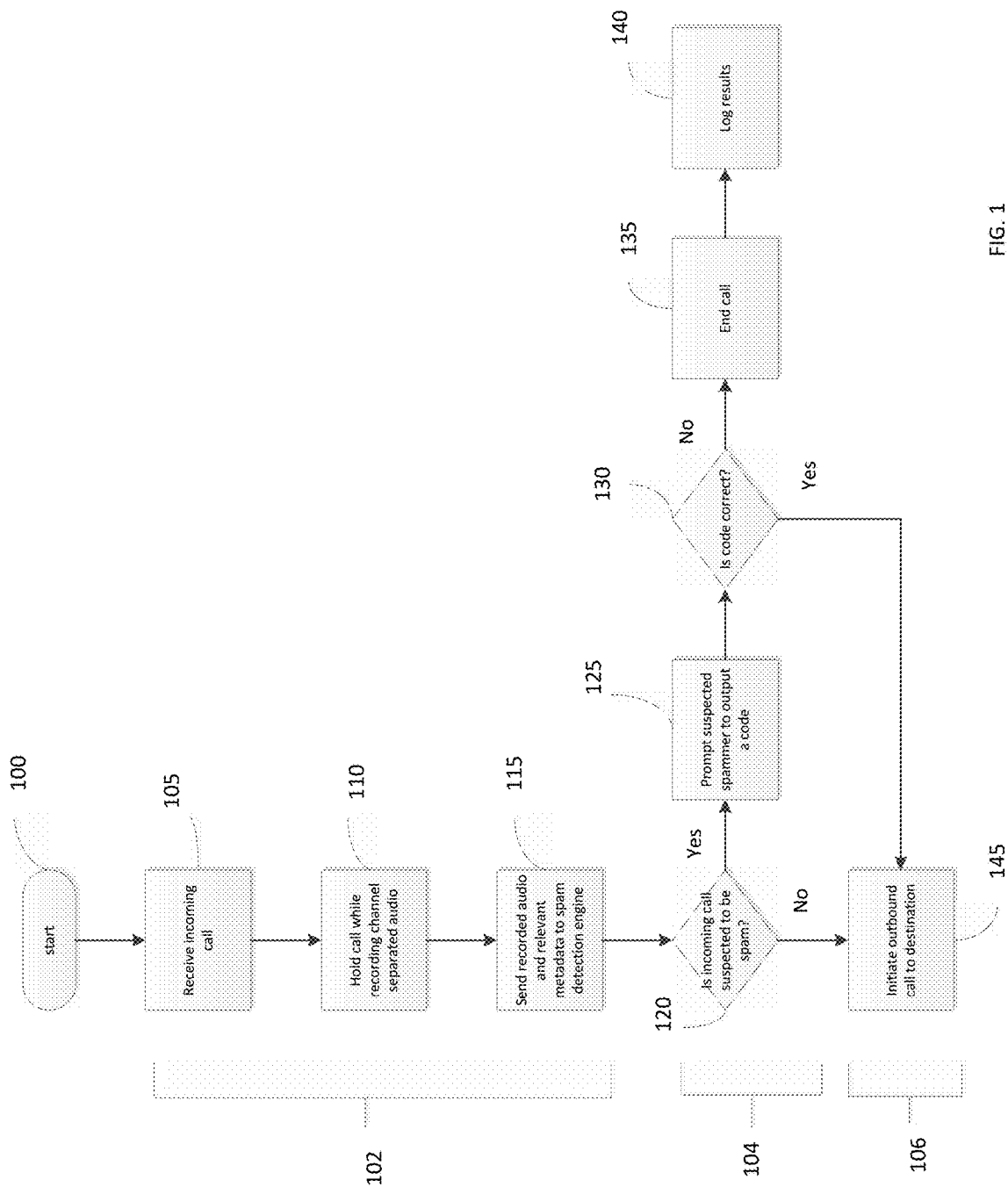
FIG. 1 is an illustrative diagram provided to explain one methodology provided by the disclosed embodiments.

FIG. 1 is an illustrative diagram provided to explain one methodology provided by the disclosed embodiments. As can be seen in FIG. 1, all incoming calls are subjected to a holding phase 102, an analyzing phase 104, and a routing phase 106. As shown in FIG. 1, the methodology begins at 100 and, holding phase 102 is implemented when an incoming call over a communication network (e.g., PSTN, Voice Over IP, etc.) is received at a 1-800 number at 105, control proceeds to 110, at which time the call is held while simultaneously recording channel separated audio from the incoming call. Control then proceeds to 115, at which the recorded audio and other relevant medatada, such as caller ANI, destination number, tracking number, custom ANI II headers, OCN information, and full SIP headers, is sent to a spam detection engine for processing.

The method then enters the analyzing phase 120, at which the recorded audio analyzed against stored fraudulent audio patterns. If, at 120, there is a match between the recorded audio and one of the stored fraudulent audio patterns, the call is identified as fraudulent. If at 120, the incoming call does not match a stored fraudulent audio pattern, the call is identified as desired, or non-fraudulent.

The incoming call, now identified as fraudulent or non-fraudulent is taken off hold when it enters the routing phase. A call identified as fraudulent routed to an interactive voice response (IVR) system for confirmation. At the IVR, the suspected fraudulent caller is prompted to input a code 125. The input can be provided by a number of mechanisms such as dual-tone multi-frequency signaling (DTMF) or spoken voice. If the input code does not match the prompted code at 130, the fraudulent caller is confirmed and the call is disconnected, or ended 135.

It should be understood, therefore, that IVR technology may be repurposed to provide functionality with a new and different technical utility in that the IVR technology may be combined with spam detection functionality in the form of audio data analysis of incoming call content to provide a system for preventing fraudulent, nefarious or unwanted use of autodialers of various types. Because the technical problem is specific to the use of telecommunications equipment and autodialers in the context of telecommunications networks. Additionally, examples of systems for implementing IVR using various codes used to identify fraudulent calls can be found in co-pending U.S. application Ser. No. 14/641,326, the entirety of which is incorporated by reference.

The results are then logged at 140 to update the spam detection engine. The logged results can be processed by the spam detection engine to update the stored fraudulent audio pattern of the type of spam identified.

If the call is identified as non-fraudulent, the outbound call is initiated to the call destination at 145. In the case where the call is identified by the spam detection engine, the caller is able to bypass the IVR system. Therefore, the non-fraudulent caller may be completely unaware that any spam detection has taken place.

In at least some embodiments, the holding and analyzing phases in combination, should last a predetermined period of time no more than six and a half seconds, and more specifically six seconds. This minimizes the amount of ring abandon that occurs when a caller spends too much time on the line before reaching his destination since the process occurs transparently to the incoming caller. Additionally, the recording of audio data content occurs in a manner such that the caller remains unaware that the call is taking longer than it should. For example, the control may record the audio data content while the incoming call is still ringing, i.e., the call has not been established or connected. Moreover any synchronous operation may be performed during the six seconds such as a greeting from a callee (client), music, or other audio information.

Figure 2:
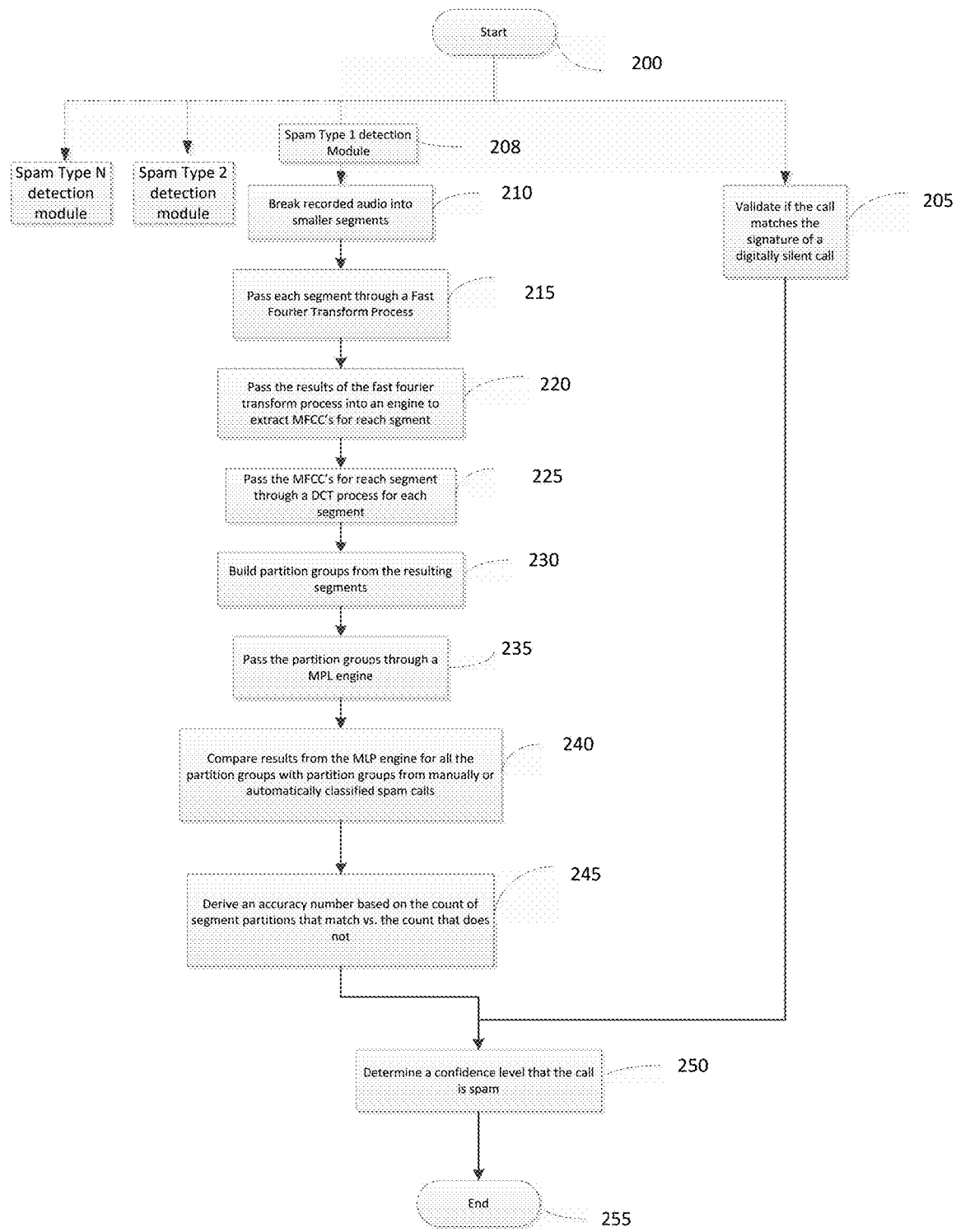
FIG. 2 is an illustrative diagram that explains one methodology provided in the spam detection engine of FIG. 1.
Figure 3:
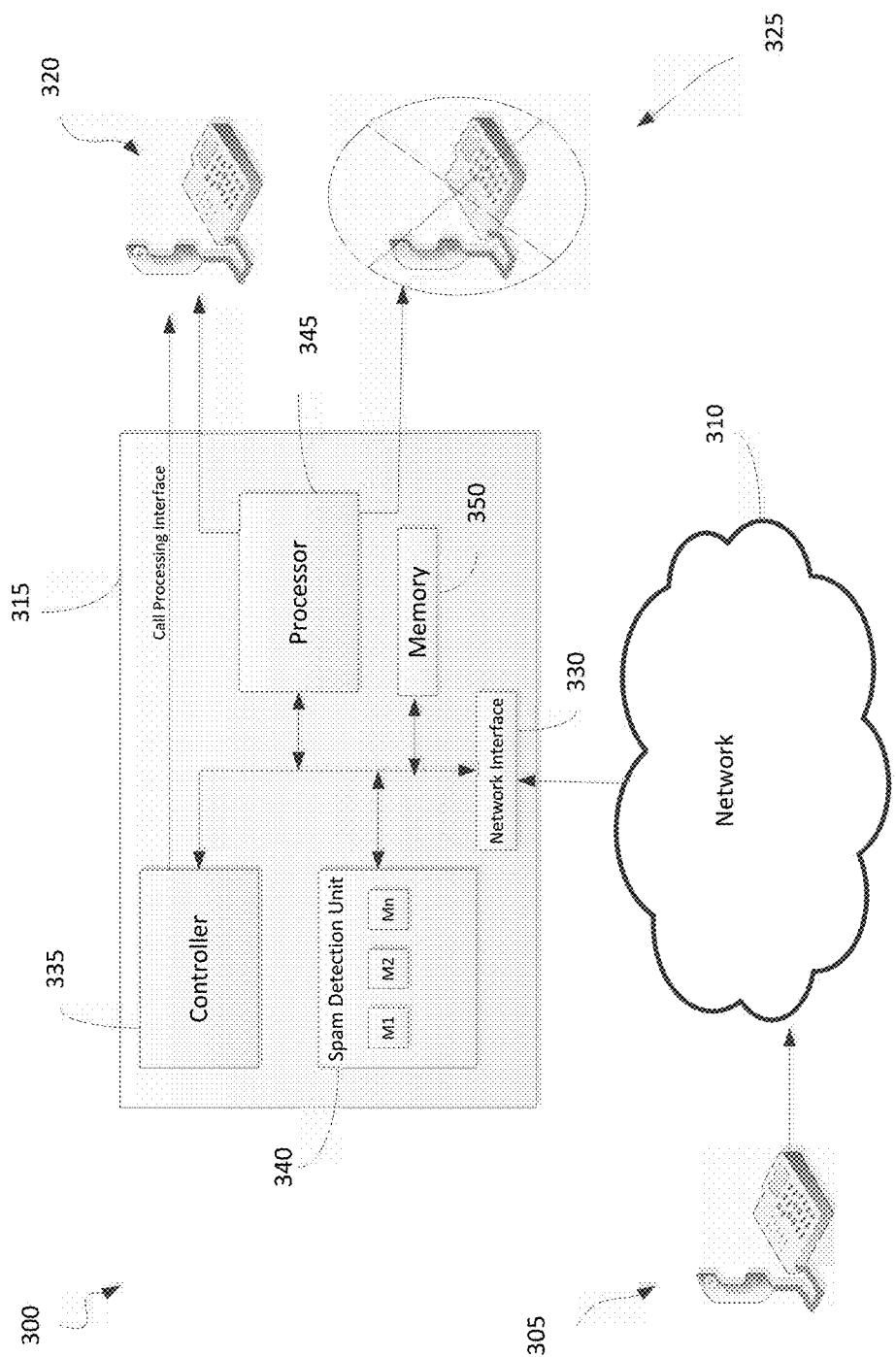
FIG. 3 is an illustrative block diagram of a telecommunications system that can implement the spam detection methodology of FIG. 1.

As seen in FIG. 2, in the analyzing phase, the recorded audio data content may be sent through multiple spam type modules 208. By way of example, a single flow is shown through a single module, spam type-1 detection module 208. However, numerous spam-type modules, spam type-1, spam type-2, . . . spam-type-n, are contemplated to compare the recorded audio against multiple different types of spam. The recorded audio is broken into smaller segments 210, ranging between 100-1000 ms per segment depending on the type of spam being detected in the module. Each segment may be passed through a Fast Fourier Transform (FFT) process 215. The results of the FFT processing may be passed into an engine to extract Mel-Frequency Cepstral Coefficients (MFCCs) for each audio data content segment at 220. The MFCCs for each segment are next passed through a Discrete Cosine Transform (DCT) process for each segment at 225. Subsequently, at 230, partition groups may be built from the results of the DCT process for the multiple segments. The partition groups may then be passed through a neural network, for example a Multi-Layer Perceptron (MLP) engine, at 240.

The results from the MLP engine for all partition groups may then be compared with stored partition group patterns from manually or automatically classified spam phone calls at 245 and an accuracy number is derived based on the count of segment partitions that match versus the total number of partitions at 250. Based on a predetermined confidence level, or threshold of matching-to-unmatching segment partitions, a determination is made whether the call is spam, or fraudulent at the process end 255. Each type of spam may employ a different confidence level. For example, political spam may require a 75% confidence level in order to determine the call is likely spam, whereas robocalls may require an 85% confidence level based on the known variation in audio patterns across a particular type of spam.

Occurring in parallel to operations of the spam detection engine described in connection with FIG. 2, captured audio may be processed to determine if the call matches a signature of a digitally silent, or dead air, call at 205. This can be performed by passing the recorded audio data content through an application that extracts the overall standard ratio of peak to root mean square of the signal. This may be used to measure the flatness of the signal at peak levels, e.g., consecutive samples with the same value. The flatness may then be used to validate if the call matches the signature of a digitally silent call.

Digitally silent calls are typically robocall-executed by a machine with no audio stream passed via RTP and are distinguishable from a muted line, or an open line where no communication occurs. In response to a determination that the call matches the signature of a digitally silent call, it is determined that the call is likely spam 255. The call may then be sent to the IVR as illustrated in FIG. 1.

The spam detection engine and spam type modules may be created using data from known spam calls. Some examples of data used to create the engine include client feedback loops on calls that reached agents, manually reviewed phone calls, internal honeypots, and programmatic approaches that compare entire waveforms. Based on this data, calls that are considered validated spam can be identified for each spam type. The audio from the first six seconds of each of these calls considered validated spam are then fed into the spam detection engine and the resulting data is used to build the baseline for each spam type module and used to compare against future incoming calls. The spam detection unit may also store call metadata useful in identifying spam based call variables such as caller ANI, destination number, and tracking number.

A telecommunications system 300 may be provided for routing an incoming call 305 through a network 310 to a call processing interface 315. Call processing interface 315 connects an incoming call to its destination 320 or identifies a fraudulent call and terminates the incoming call and does not connect the incoming call to its destination 325.

Call processing interface may include a network interface 330 for receiving incoming call 305 and providing communication between each of a controller 335, a spam detection unit 340, a processor 345, and a memory 350. Incoming call 305 is received by controller 335, that may hold and record a portion of the incoming call. The spam detection unit 340 includes a plurality of detection modules M1, M2, . . . Mn for processing the recorded portion to identify a likely fraudulent call. Spam detection unit may of communicating its results with controller 335.

Controller 335 may connect non-fraudulent calls to the intended destination 230. Suspected fraudulent calls may be sent to a processor 345, such as an IVR system, to further verify whether the call is fraudulent. Processor 345 may connect non-fraudulent calls to destination 320 and may terminate calls and prohibit connection for fraudulent calls 325. Memory 350 may store instructions for each of the system components, and may be updated with data from incoming fraudulent and non-fraudulent calls, which in turn may be communicated with the spam detection unit to update spam profiles in the detection modules.

It should be understood that some or all of the methodology explained above may be performed on, utilizing or with access to one or more servers, processors and associated memory. Unless specifically stated otherwise, and as may be apparent from the above description, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It should be understood that the disclosed embodiments may also be used to thwart other fraudulent schemes. For example, using the technique of Wangiri, autodialers have been used to make many short-duration calls, mainly to mobile devices, leaving a missed call number which is either premium rate or contains advertising messages. Presently disclosed embodiments could be built into call management or call forwarding software to prevent or deter such schemes.

Thus, it should be understood that the disclosed embodiments have utility in combating fraudulent practices for numbers other than toll free and other fee generating numbers. Moreover, this functionality further protects against traffic pumping, also known as access stimulation, which is a controversial practice by which some local exchange telephone carriers in rural areas of the United States inflate the volume of incoming calls to their networks, and profit from the greatly increased intercarrier compensation fees to which they are entitled by the Telecommunications Act of 1996.

It should be understood that the presently disclosed embodiments may be used not only to protect against robocalling to 1-800 numbers but can also be used to protect against such calls made to local telephone numbers.

While various exemplary embodiments have been described above, it should be understood that they have been presented by way of example only, and not limitation. Thus, the breadth and scope of the present invention should not be limited by any of the above-described exemplary embodiments.

The invention claimed is:

1. An automated method for determining and terminating undesired inbound calls, the method comprising:
    receiving an incoming phone call;
    activating a controller in response, the controller holding the incoming call and recording audio from the incoming call;
    evaluating the recorded audio with a spam detection engine to determine if the incoming call is spam; and
    in response to a determination the call is spam, prompting the incoming call to input a code with an interactive voice recognition (IVR) system,
    wherein when the code input by the incoming call does not match the prompted code, the call is terminated,
    wherein evaluating the recorded audio comprises:
    segmenting the recorded audio into segments,
    building partition groups from the processed segments,
    comparing the partition groups to stored spam profiles, and
    deriving an accuracy number based on the number of segment partitions that match a profile versus the number of segment partitions that do not match the profile.

2. The method of claim 1, further comprising initiating an outbound call to a call destination in response to a determination by the spam detection engine that the incoming call is not spam.

3. The method of claim 2, wherein the incoming call bypasses the internal voice recognition system when the spam detection engine determines that the incoming call is not spam.

4. The method of claim 1, wherein when the code input by the incoming call matches the prompted code, an outbound call to a call destination is initiated.

5. The method of claim 1, wherein when the accuracy number exceeds a threshold, the incoming call is identified as spam.

6. The method of claim 1, wherein in response to a determination the call is not spam, bypassing the IVR system.

7. A telecommunications system for determining and blocking undesired inbound calls, the system comprising:
    a controller that receives and holds an incoming call and records audio from the incoming call;
    a spam detection unit that evaluates the audio from the incoming call and determines whether the incoming call is spam; and
    a processor that provides a code prompt to the incoming call and a prompt to the incoming call to input the code in response to a determination by the spam detection unit that the incoming call is spam and bypasses the code prompt in response to a determination by the spam detection unit that the incoming call is not spam,
    wherein the processor terminates the incoming call when the code input by the incoming call does not match the provided code prompt,
    wherein the spam detection unit comprises a plurality of spam type modules and each spam type module is configured to detect a different type of spam.

8. The telecommunications system of claim 7, wherein the plurality of spam type modules evaluate the audio in parallel.

9. The telecommunications system of claim 7, wherein each spam type module compares the audio with known spam patterns and the audio is determined to be a type of spam if a particular confidence threshold is met between the audio and a known spam pattern.

10. The telecommunications system of claim 7, wherein each of the plurality of spam type modules is configured to:
    segment the recorded audio into segments,
    build partition groups from the processed segments,
    compare the partition groups to stored spam profiles, and
    derive an accuracy number based on the number of segment partitions that match a profile versus the number of segment partitions that do not match the profile.

11. The telecommunications system of claim 7, wherein the controller updates the spam detection engine with the recorded audio from the blocked call.

12. The telecommunications system of claim of claim 11, wherein the audio is fed into a baseline spam pattern of a type of spam the audio was identified as.

13. The telecommunications system of claim 7, wherein the system identifies spam in about six seconds.

14. The system of claim 7, wherein the controller is further configured to pass the audio through dead-air application to identify a digitally silent call.

15. A telecommunications system for determining and blocking undesired inbound calls, the system comprising:
    a control that receives and holds and incoming call and records audio from the incoming call; and
    a spam detection unit configured to determine whether the incoming call is spam;
    wherein the spam detection unit has a plurality of spam type modules, each module configured to identify a particular type of spam.

16. The system of claim 15, wherein the spam detection unit segments the recorded audio into different segment lengths for analysis in each spam type module.

17. The system of claim 15, wherein the spam detection unit includes spam type modules for one or more of tollfree pumping, political spam, and data collection bots.

18. The telecommunications system of claim 15, further comprising a processor configured to terminate the incoming call when the spam detection unit determines the incoming call is spam.

* * * * *